US007269639B1

(12) United States Patent
Lawrence

(10) Patent No.: US 7,269,639 B1
(45) Date of Patent: Sep. 11, 2007

(54) METHOD AND SYSTEM TO PROVIDE SECURE IN-BAND MANAGEMENT FOR A PACKET DATA NETWORK

(75) Inventor: Jeremy Lawrence, Sydney (AU)

(73) Assignee: Cisco Technology, Inc., San Jose, CA (US)

( * ) Notice: Subject to any disclaimer, the term of this patent is extended or adjusted under 35 U.S.C. 154(b) by 679 days.

(21) Appl. No.: 09/738,807

(22) Filed: Dec. 13, 2000

(51) Int. Cl.
G06F 15/177 (2006.01)
G06F 9/00 (2006.01)
G06F 15/173 (2006.01)
G06F 3/00 (2006.01)
H04L 9/00 (2006.01)

(52) U.S. Cl. ............. 709/220; 726/15; 713/153; 709/238; 710/36

(58) Field of Classification Search ............ 713/1, 713/201, 100; 709/220–223, 250; 726/15
See application file for complete search history.

(56) References Cited

U.S. PATENT DOCUMENTS

| 6,079,020 A * | 6/2000 | Liu .................... 713/201 |
| 6,175,917 B1 * | 1/2001 | Arrow et al. .............. 713/1 |
| 6,226,751 B1 * | 5/2001 | Arrow et al. ............ 713/201 |
| 6,701,437 B1 * | 3/2004 | Hoke et al. ............. 713/201 |
| 6,751,729 B1 * | 6/2004 | Giniger et al. .......... 713/153 |
| 6,785,728 B1 * | 8/2004 | Schneider et al. ....... 709/229 |
| 6,832,322 B1 * | 12/2004 | Boden et al. ............. 726/15 |

OTHER PUBLICATIONS

Newton, Harry; Newton's Telecom Dictionary; 2002; CMP Books; 18th edition, definitions of "VPN", "tunneling" and "gateway".*

* cited by examiner

Primary Examiner—Alan S. Chen
(74) Attorney, Agent, or Firm—Blakely, Sokoloff, Taylor & Zafman LLP

(57) ABSTRACT

A method and system to provide secure in-band management for a packet data network are disclosed. In a network device for configuring a virtual private network (VPN), management traffic is received over the VPN. The network device is managed using the management traffic received over the VPN. An in-band management system is created by configuring a virtual private network (VPN) for a network device and linking the VPN to a management device or a management function. By using the VPN to carry management traffic and to create the in-band management system, management of the network device can be made secure.

23 Claims, 9 Drawing Sheets

METHOD AND SYSTEM TO PROVIDE SECURE IN-BAND MANAGEMENT FOR A PACKET DATA NETWORK

FIELD OF THE INVENTION

The present invention relates generally to communication networks. More particularly, the present invention relates to a method and system to provide secure in-band management for a packet data network.

BACKGROUND OF THE INVENTION

A communication network includes a collection of interconnected network devices, which allow users to access data. A popular network is the Internet. The Internet is a worldwide system of interconnected networks that allow data ("packets") to pass between network boundaries. The Internet uses an Internet Protocol (IP) to provide routing and forwarding services. A common network device that provides IP services is a router. A router routes and forwards packets using an optimal path. A common function performed on the IP network is router management. Router management is the process of configuring a router to provide necessary services.

Typically, router management can be performed using either an out-of-band or an in-band management configuration. FIG. 1 illustrates a prior art out-of-band management configuration 100 for a router 102 connected to a separate management network 104. An out-of-band management configuration requires a separate network (i.e., connections and communication lines) instead of using existing data links of the routers to facilitate the router management process. Referring to FIG. 1, router 102 includes two sets of data links, which are core input/output data links 120 and customer input/output data links 122. Each of these two sets of data links can receive and transmit packets. In addition, router 102 includes management ports 124, router configuration management module 110, and routing and forwarding module 112. Management devices 106 manage and communicate with router 102 via management network 104 and management ports 124.

Router configuration module 110 receives management commands from management devices 106 and perform management operations for router 102 using the received management commands. For example, a user of one of the management devices 106 can input a management command via a command line interface (CLI) to router 102. Routing and forwarding module 112 receives packets on data links 120 and 122 and selectively routes and forwards the packets on data links 120 and 122.

FIG. 2 illustrates a prior art network 200 for a plurality of routers 102-1 through 102-7 using an out-of-band network management configuration. Router 102 of FIG. 1 can represent the plurality of routers 102-1 through 102-7 of FIG. 2. Data links are normally grouped in pairs of one input data link and one output data link. Each pair having one bi-directional data path between two network devices. This is illustrated in FIG. 2 by showing bi-directional customer input/output data links 220 and 222. The plurality of routers 102-1 through 102-7 can selectively forward data packets from any input data link to any output data link in accordance with the source and destination information contained in the data packet.

Referring to FIG. 2, a plurality of management links 226 couple routers 102-1 through 102-7 with management devices 106. Management links 226 transmit management commands from management devices 106 to routers 102-1 through 102-7 via management network 104. Furthermore, management devices 106 can receive responses such as, for example, status of management command actions, alarms, traps, or notifications from routers 102-1 through 102-7 via management links 226 and management network 104. Hence, configuration 100 and network 200 provide out-of-band management because management communication is carried on a separate network 104 instead of using existing data links.

A disadvantage of using out-of-band management is that it requires a separate management network. That is, separate management network 104 requires extra equipment, additional configuration, and extra data links to connect routers 102-1 through 102-7 to management devices 106. Although out-of-band management can be made secure by using separate management network 104, separate management network 104 adds another layer of complexity for managing network devices.

FIG. 3 illustrates a prior art in-band management configuration 300 for router 302 having an internal management connection 311. An in-band management configuration uses current network infrastructure to facilitate the router management process. Referring to FIG. 3, router 302 includes internal management connection 311 between routing and forwarding module 312 and router configuration management module 310. Router 302 also includes management ports 324, core input/output data links 320, and customer input/output data links 322. Thus, router 302 can receive management commands using the current network infrastructure (i.e., by using core input/output data links 320).

FIG. 4 illustrates a prior art in-band management configuration 400 for router 402 supporting virtual private network (VPN) modules 431A through 431C having an internal management connection 411. A VPN is a private data network that makes use of the currently implemented network by using a tunneling protocol for security purposes. VPN data links 422A through 422C connect with VPN modules 431A through 431C, respectively. The VPN module 431A facilitates private communication on data links 422A either on this router, or attached to the same modules on different routers. The same applies to the other VPN modules and corresponding links.

Referring to FIG. 4, router 402 includes internal management connection 411 between generic routing and forwarding module 412 and router configuration management module 410. Router 402 also includes management ports 424, core data links 420, VPN data links 422A through 422C, and data links 423. Thus, router 402 can also receive management commands using the current network infrastructure (i.e., by using core data links 420).

A disadvantage of using the prior art an in-band management schemes is a lack of security for carrying management traffic. That is, the management traffic or commands are carried on non-secure data links (e.g., core data links 420). Thus, prior art in-band management configuration schemes are susceptible to unauthorized management entry or interception of management commands.

SUMMARY OF THE INVENTION

A method and system to provide secure in-band management for a packet data network are disclosed. For one embodiment, in a network device for configuring a virtual private network (VPN), management traffic is received over the VPN. The network device is managed using the management traffic received over the VPN. An in-band management system is created by configuring a virtual private network (VPN) for a network device and linking the VPN to a management device or a management function. By using the VPN to carry management traffic and to create the in-band management system, management of the network device can be made secure.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A method and system to provide secure in-band management for a packet data network are described. For one embodiment, in a network device for configuring a virtual private network (VPN), management traffic is received over the VPN. The network device is managed using the management traffic received over the VPN. An in-band management system is created by configuring a virtual private network (VPN) for a network device and linking the VPN to a management device or a management function. By using the VPN to carry management traffic and to create the in-band management system, management of a network can be made secure.

In the following description, network management techniques are described with respect to a network router that provides routing and forwarding services. The network management techniques described herein, however, are not intended to be limited to any particular type of network device and can be implemented with other types of network devices that provide routing and forwarding services such as, for example, network switches, bridges, hubs, or gateways. The network devices can also perform Internet Protocol (IP) or Multiprotocol Label Switching (MPLS) services.

Furthermore, in the following description, network management techniques are described in the context of packet data networks such as the Internet. Nevertheless, other types of networks and data units can implement the management techniques described herein such as an asynchronous transfer mode (ATM) network for ATM cells.

Figure 1:
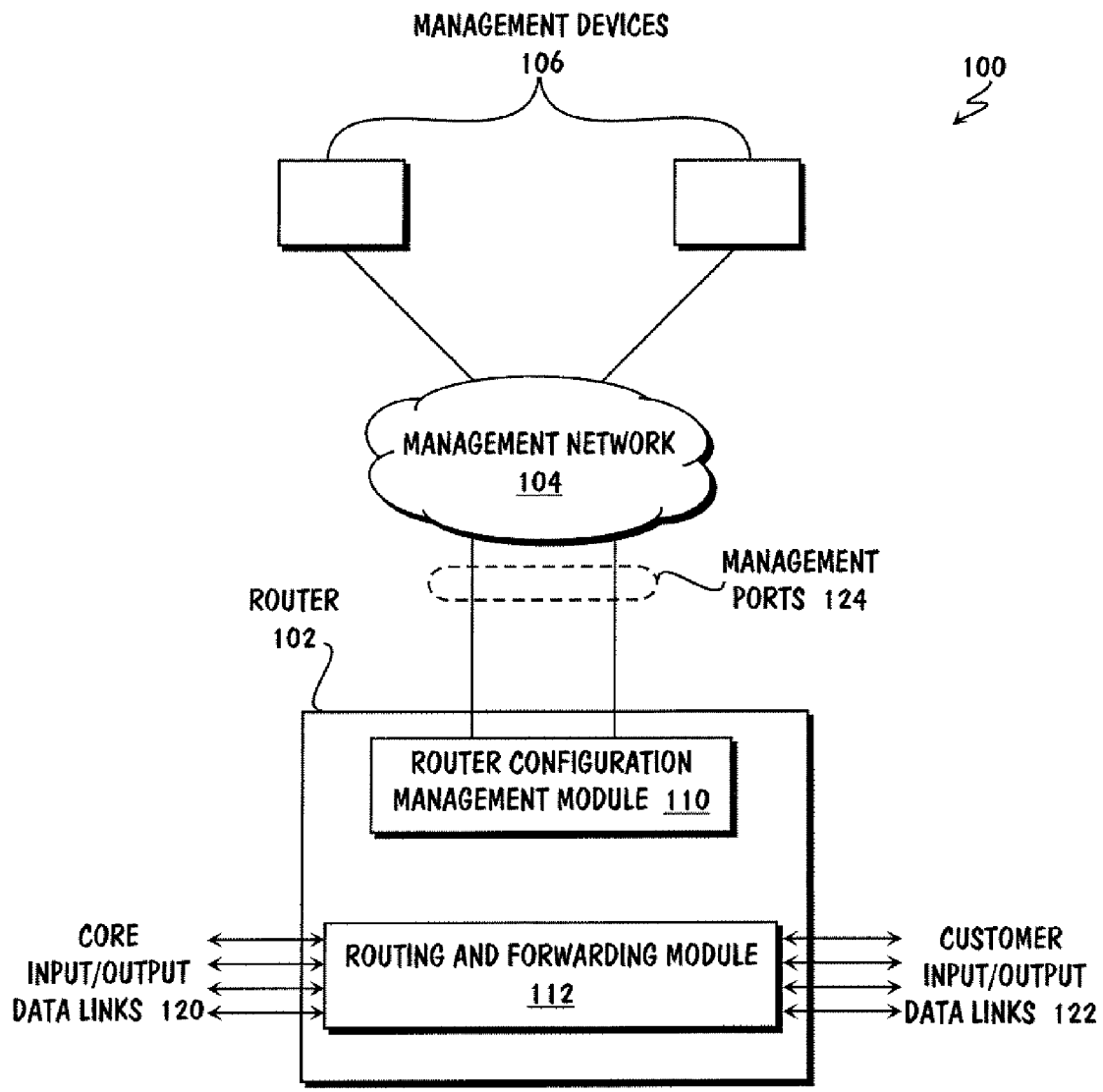
FIG. 1 illustrates a prior art out-of-band management configuration for a router connected to a separate management network.
Figure 2:
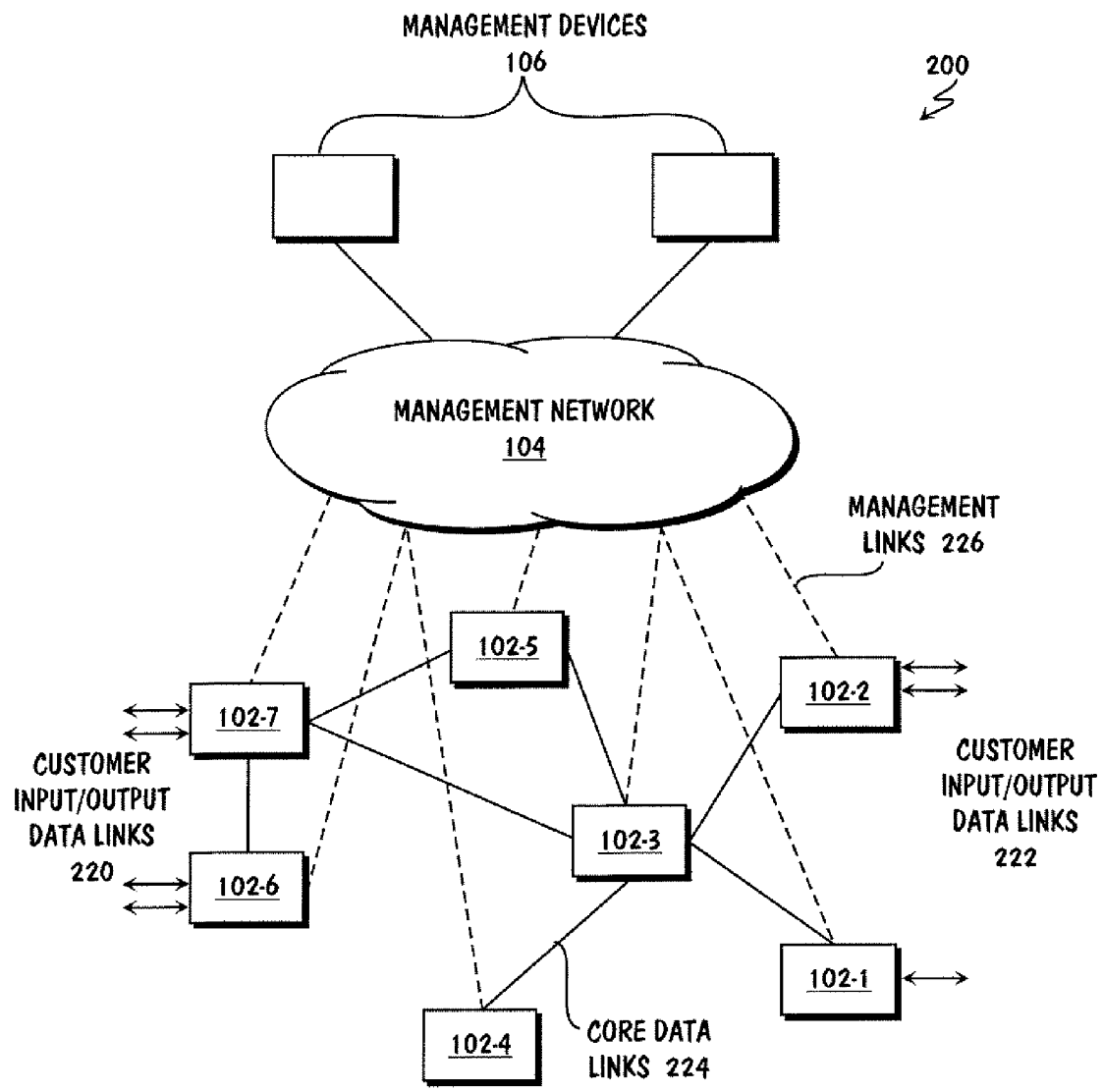
FIG. 2 illustrates a prior art out-of-band management network for a plurality of routers.
Figure 3:
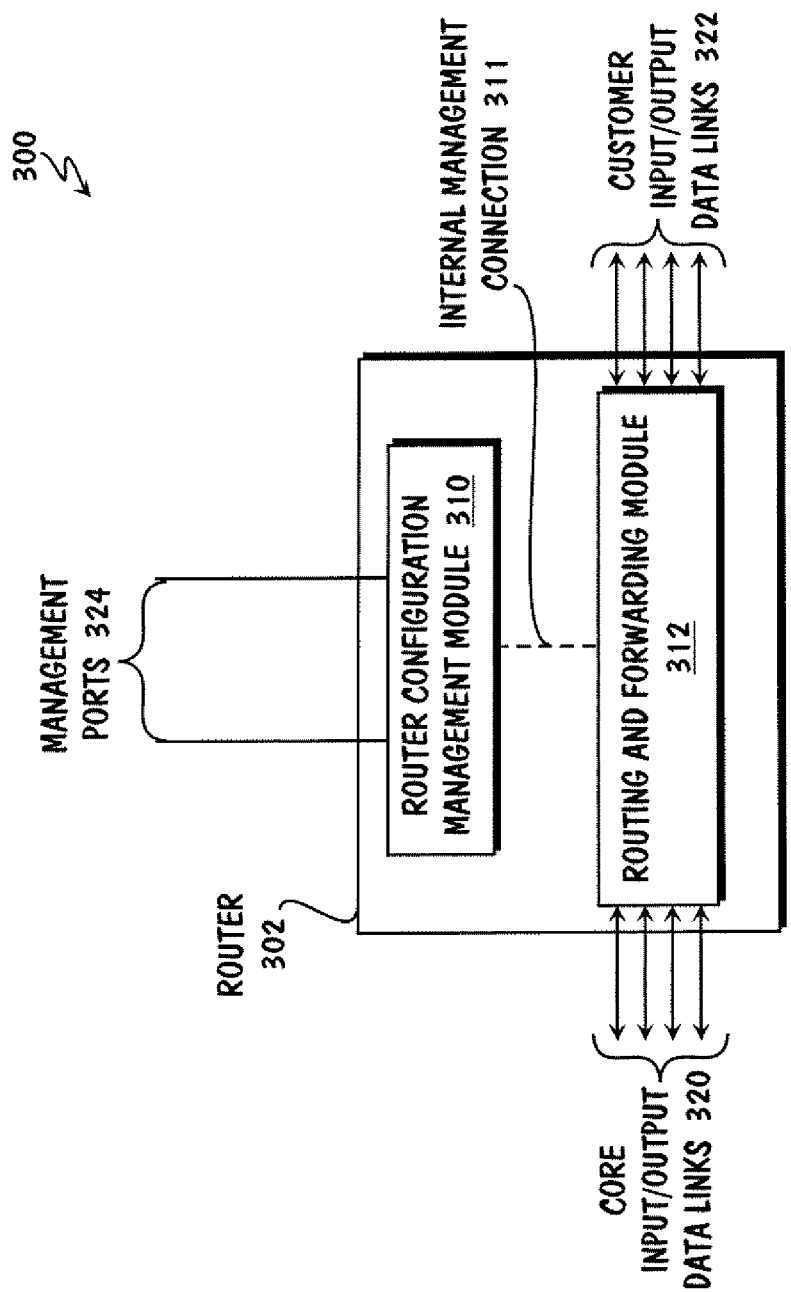
FIG. 3 illustrates a prior art in-band management configuration for a router having an internal management connection.
Figure 4:
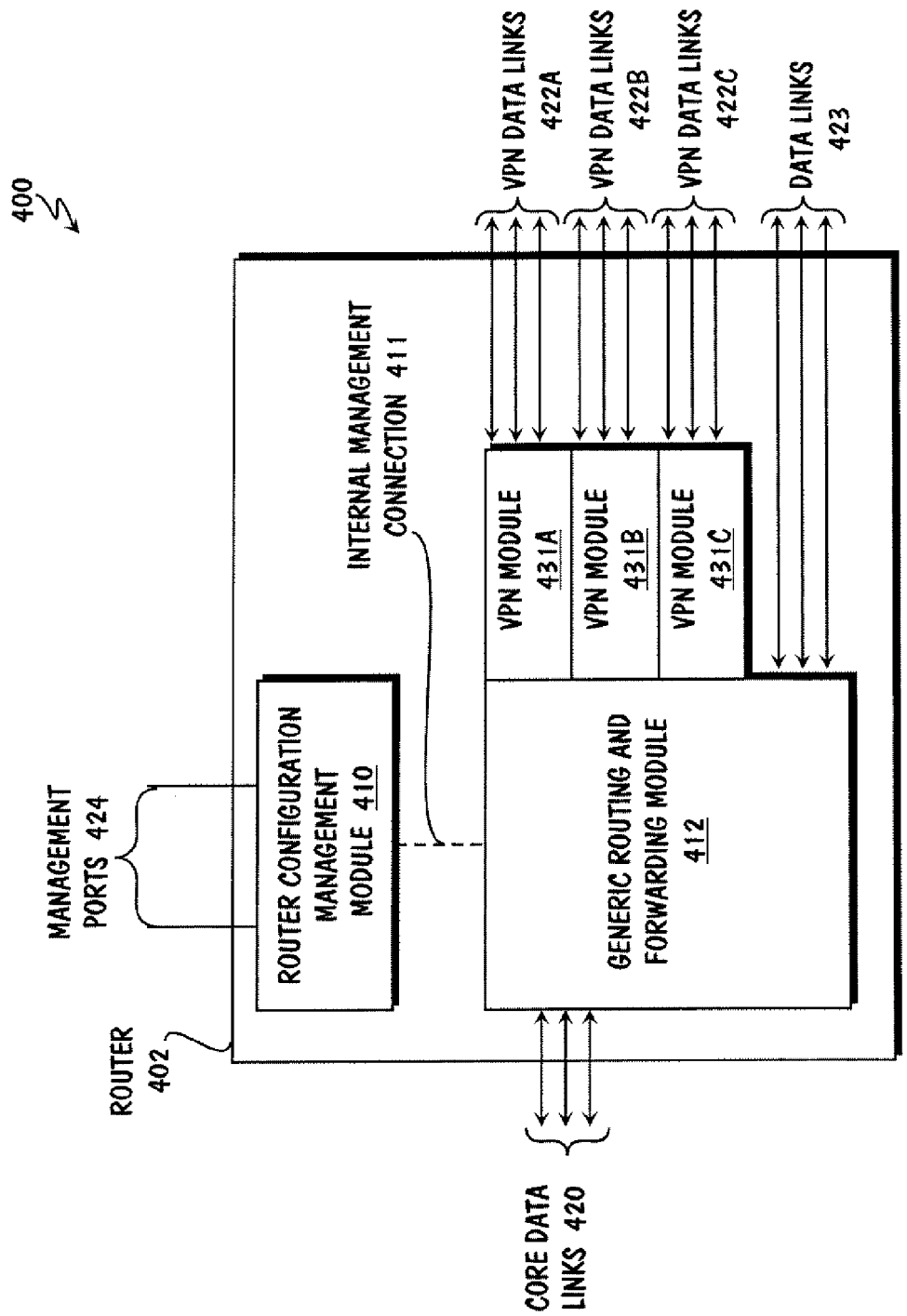
FIG. 4 illustrates a prior art in-band management configuration for a router supporting virtual private networks having an internal management connection.
Figure 5:
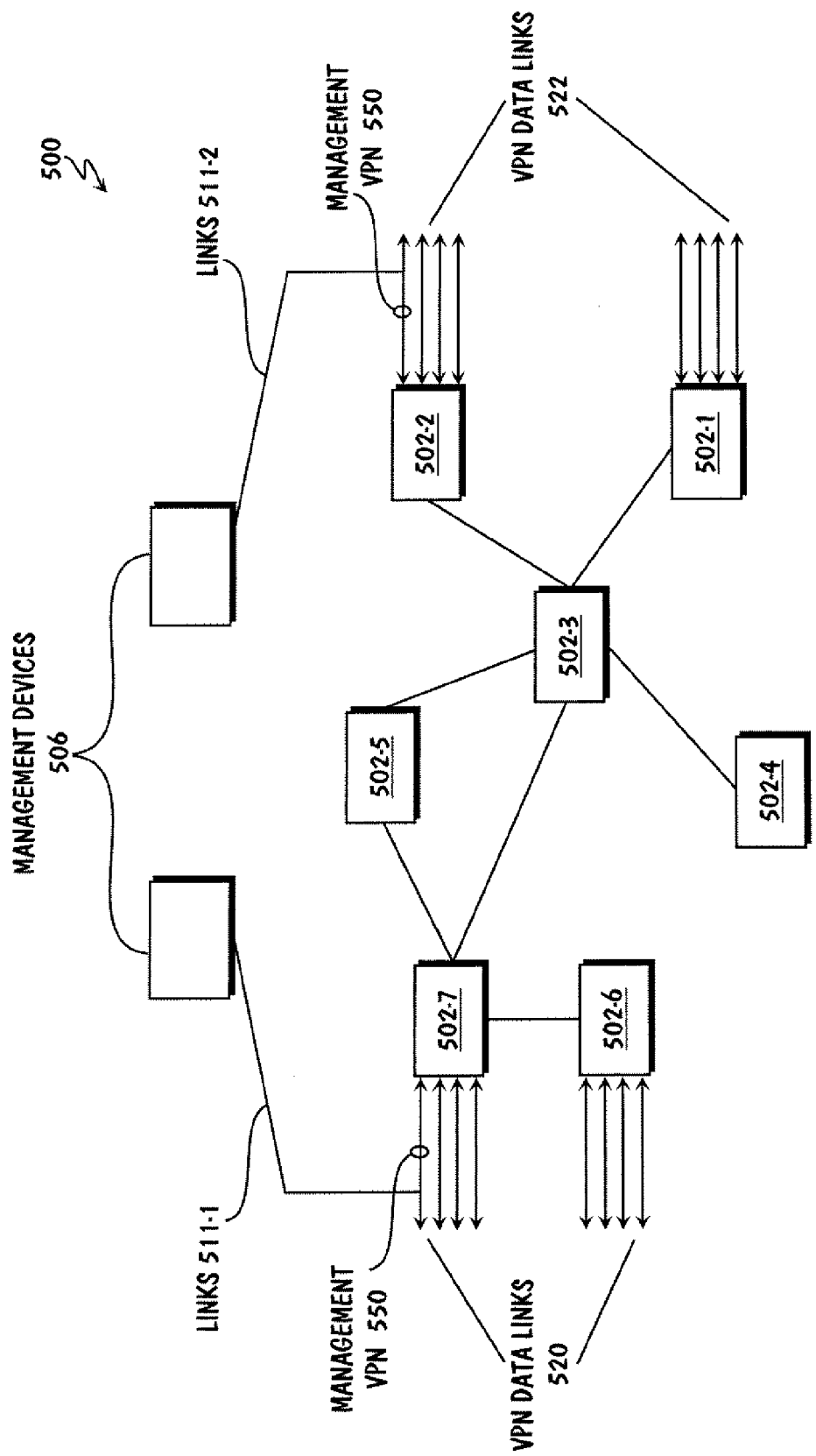
FIG. 5 illustrates an exemplary diagram of a network environment in which the present invention can be implemented.

FIG. 5 illustrates an exemplary diagram of a network environment 500 in which the present invention can be implemented. Referring to FIG. 5, the network environment 500 includes a plurality of interconnected routers 502-1 through 502-7 that can configure and support virtual private networks (VPNs) on VPN data links 520 and 522. Alternatively, network environment 500 can support a combination of VPNs and non-VPNs. In the example of FIG. 5, a management VPN 550 can be used to carry management traffic for network environment 500. Management VPN 550 is a VPN with several "customer" links, i.e., VPN data links 520 and 522. In one embodiment, management VPN 550 is not used by an actual "customer" but used by the network provider or network management personnel to manage securely routers 502-1 through 502-7. Because management traffic is carried on a VPN, the management traffic can be secure.

For one embodiment, management devices 506 can be directly connected to routers 502-1 through 502-7. Management devices 506 can be a workstation, computer, server, or other like device. In one embodiment, routers 502-5 and 502-7 are connected to management devices 506 via links 511-1 and 511-2, which connect to management VPN 550. In an alternate embodiment, management devices 506 can be omitted and management traffic can be passed internally within routers 502-1 through 502-7 using management VPN 550. Furthermore, each of the routers 502-1 through 502-7 can jointly support the management VPN 550 to carry management traffic.

A management process can be performed on each of the routers 502-1 through 502-7 using management VPN 550. Management devices 506 can include terminals or network management equipment for command line interface (CLI) control of routers 502-1 through 502-7. For example, a user via a command line interface (CLI) terminal can send a management command on management VPN 550 to configure one of the routers 502-1 through 502-7 to perform a specific capability, e.g., to tear down a link, even though the terminal is generally not connected directly to the routers 501-1 through 502-7.

Routers 502-1 through 502-7 also perform routing and forwarding functions for network environment 500. Routers 502-1 through 502-7 can support a number of routing protocols such as a Border Gateway Protocol (BGP), Routing Internet Protocol (RIP), Intermediate System to Intermediate System Protocol (IS-IS), or an Open Shortest Path First Protocol (OSPF). A routing protocol allows a router to use an optimal path to forward packets through the network. Routers 502-1 through 502-7 can also perform IP layer 3 switching or multiprotocol label switching (MPLS) for network environment 500.

Figure 6:
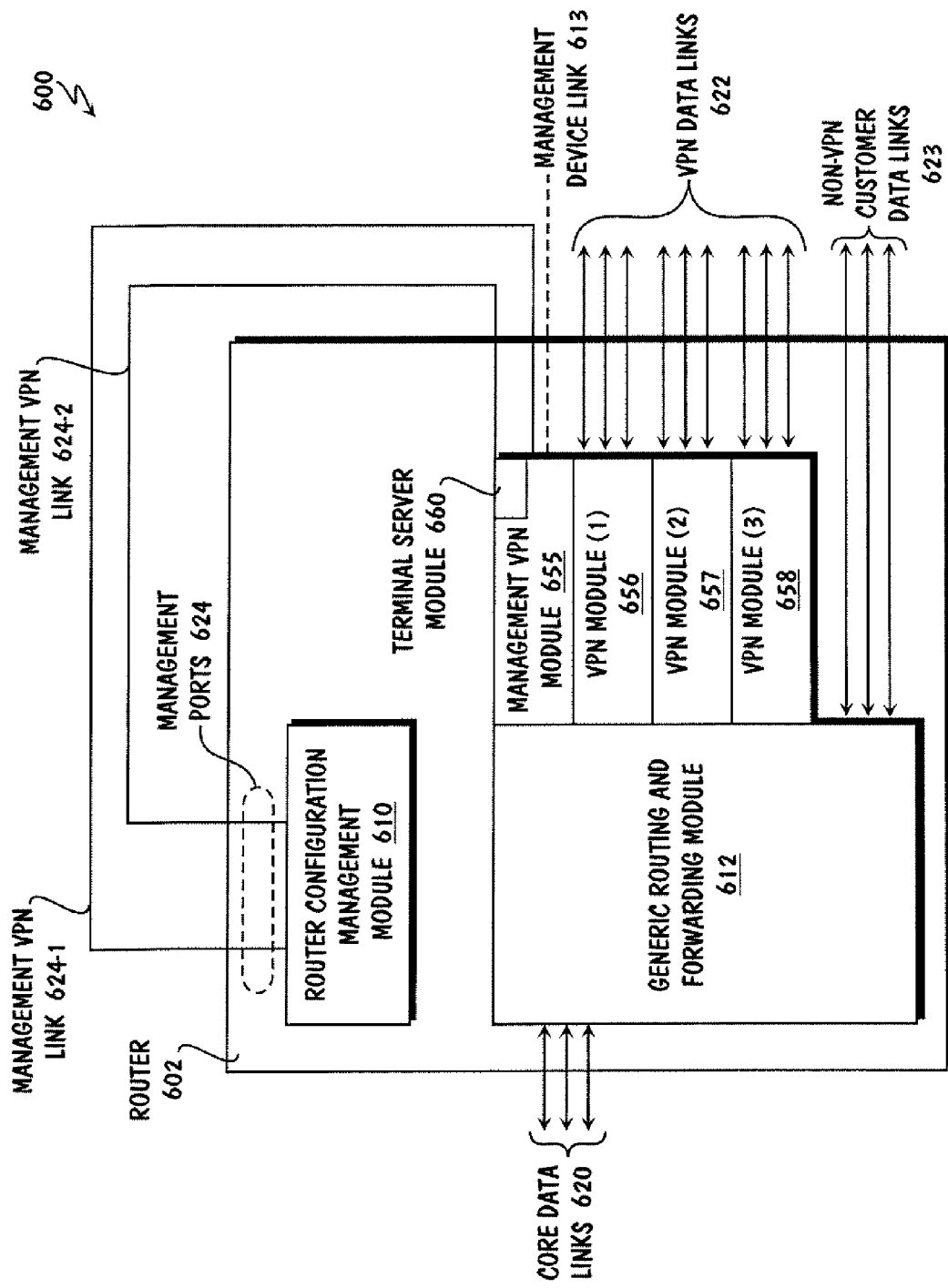
FIG. 6 illustrates an in-band management configuration for a router using a virtual private network to carry management traffic according to one embodiment.

FIG. 6 illustrates an in-band management configuration 600 for router 602 using management VPN module 655 to carry management traffic according to one embodiment. Router 602 can be used for routers 502-1 through 502-7 in FIG. 5. Referring to FIG. 6, router 602 includes core data links 620, generic routing and forwarding module 612, a plurality of VPN modules VPN module 1 (656) through VPN module 3 (658), VPN data links 622, non-VPN customer data links 623, management VPN links 624-1 and 624-2, management ports 624, management device link 613 (optional link), and router configuration management module 610.

Management VPN links 624-1 to 624-2 connect management VPN module 655 to router configuration management module 610 via management ports 624. Thus, management traffic can be sent to router configuration management module 610 via management VPN module 655. Alternatively, router 602 can be directly connected to a management device via management device link 613. Router configuration management module 610 can receive management traffic to perform functions, e.g., adding a link or a customer, tearing down a link, or configuring a new card for a router. For one embodiment, a user initiates the sending of the management traffic. Alternatively, an automated process can be used for sending management traffic. In one embodiment, one of the management ports 624 can be an asynchronous serial port designed primarily for direct connection with a terminal for providing a command line interface (CLI). In one embodiment, management VPN module 655 connects to management ports 624 using terminal server module 660 via management VPN link 624-2.

The generic routing and forwarding module 612 performs basic routing and forwarding of data packets for router 602. That is, generic routing and forwarding module 612 can maintain routing tables, which are used to send packets to a destination using an optimal path. The generic routing and forwarding module 612 is coupled to management VPN module 655 and to VPN module 1 (656) through VPN module 3 (658). Each of the VPN modules 655 through 658 can perform VPN-related encapsulation, routing, and forwarding functions on packets passing through router 602.

The encapsulation process entails adding extra headers to the each data packet to identify VPN membership and access; furthermore, during the encapsulation process, the data packet may be encrypted using IP security (IPSec) process or another data encryption process. In this way, the packets are kept private and secure. Furthermore, some routing and/or forwarding functions may be specific to the VPNs, which can also be carried out by the VPN modules 656 through 658. The generic routing and forwarding module 612 can also be coupled to non-VPN customer data links 623. Thus, generic routing and forwarding module 612 can selectively forward packets received on core data links 620 to VPN data links 622 or non-VPN customer data links 623.

Figure 7:
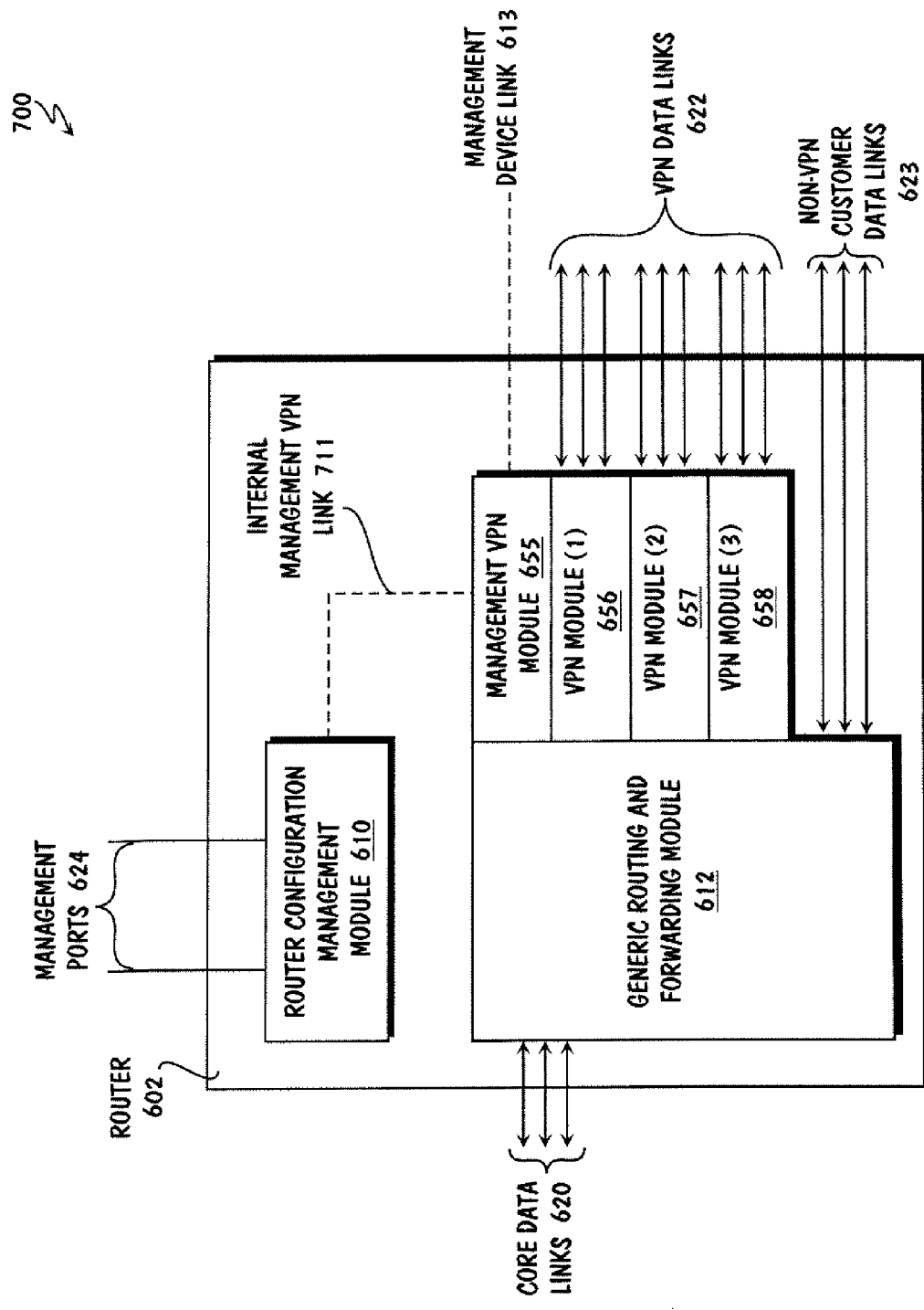
FIG. 7 illustrates an in-band management configuration for a router using a virtual private network to carry management traffic according to another embodiment.

FIG. 7 illustrates an in-band management configuration 700 for router 602 using management VPN module 655 to carry management traffic according to another embodiment. In the example of FIG. 7, an internal management VPN link 711 is used instead of an external management VPN links 624-1 to 624-2. Internal management VPN link 711 connects management VPN module 655 to router configuration module 610. Thus, management traffic can be sent to router configuration management module 610 internally via management VPN module 655 and internal management VPN link 711.

The network management techniques for a router described herein can be implemented by hardware and/or software contained within router 602 of FIGS. 6 and 7. For example, router 602 can include a network processor to execute code or instructions stored in a machine-readable medium to perform the operations as described in FIGS. 8 and 9. The machine-readable medium may include a mechanism that provides (i.e., stores and/or transmits) information in a form readable by a machine such as a processor, computer, or a digital processing device. For example, a machine-readable medium may include a read only memory (ROM), random access memory (RAM), magnetic disk storage media, optical storage media, or flash memory devices. The code or instructions can be represented by carrier wave signals, infrared signals, digital signals, and by other like signals.

Figure 8:
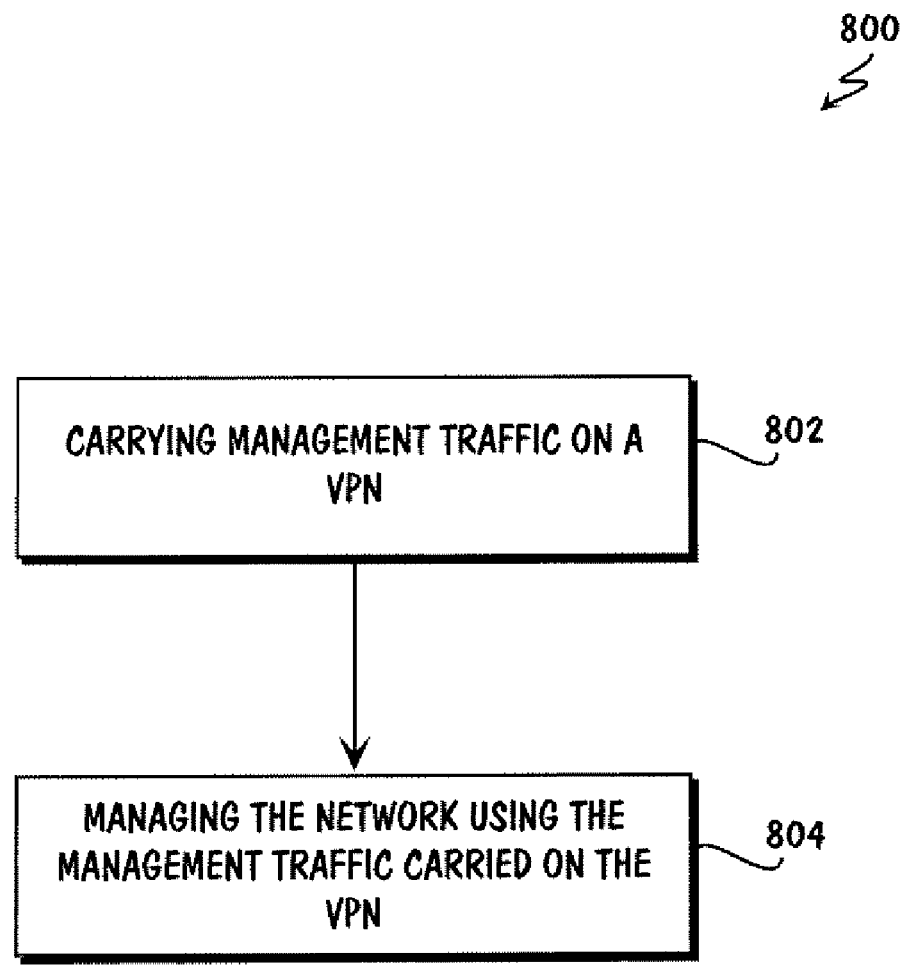
FIG. 8 illustrates a flow chart of an operation to provide in-band management according to one embodiment.

FIG. 8 illustrates a flow chart of an operation 800 to provide in-band management according to one embodiment. For purposes of explanation, operation 800 begins at operation 802. Referring to FIG. 8, at operation 802, management traffic is carried on a virtual private network (VPN). For example, user or an automated process can send management traffic on management VPN 655.

At operation 804, the network is managed using the management traffic carried on the VPN. For example, router 602 can perform a management process to add a link or a customer, to tear down a link, or to configure itself to handle a new card that has been inserted.

Figure 9:
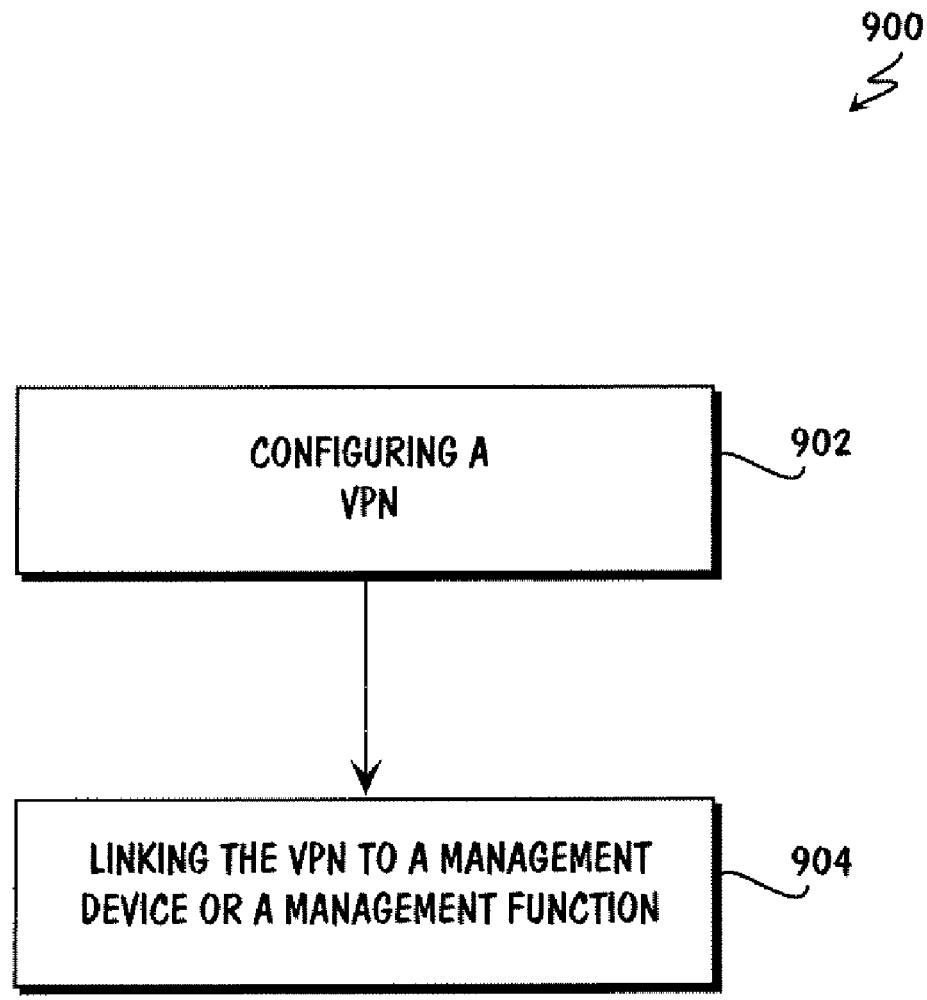
FIG. 9 illustrates a flow chart of an operation to create an in-band management system using a virtual private network according to one embodiment.

FIG. 9 illustrates a flow chart of an operation 900 to create an in-band management system using a virtual private network (VPN) according to one embodiment. For purposes of explanation, operation 900 begins at operation 902. Referring to FIG. 9, at operation 902, a VPN is configured. For example, generic routing forwarding module 612 can configure core data links 620 and VPN data links 622 to support management VPN module 655.

At operation 904, management VPN module 655 is linked to a management device or a management function. For example, router 602 can link management VPN module 655 to management devices 606 or to router configuration management module 610 ("management function").

Thus, a method and system to provide secure in-band management for a packet data network have been described. In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for secure in-band management of a network device that provides routing and forwarding services, the method comprising:
    transferring data between core data links and customer data links where the customer data links including Virtual Private Network (VPN) data links and non-VPN data links;
    dedicating one of the VPN data links to the transfer of management commands;
    linking the dedicated VPN data link to a source of management commands;
    using the VPN to transfer management commands from the source of the management commands to the network device; and
    transferring management commands between the dedicated VPN data link and a router configuration management module.

2. The method of claim 1 wherein transferring management commands between the dedicated VPN data link and a router configuration management module includes transferring management commands through a management port of the router configuration management module.

3. The method of claim 1 wherein the network device is one of a network switch, a network bridge, a network hub, and a network gateway.

4. The method of claim 1 wherein the network device can perform one of Internet Protocol (IP) services, Multiprotocol Label Switching (MPLS) services, and Asynchronous Transfer Mode (ATM) services.

5. The method of claim 1 wherein the source of the management commands is one of a management device and a management function.

6. A network device that provides routing and forwarding services, the network device comprising:
    a routing and forwarding module to transfer data between core data links and customer data links in accordance with source and destination information contained in the data, the customer data links including Virtual Private Network (VPN) data links and non-VPN data links;

a router configuration management module to perform management operations for the network device according to received management traffic; and a management VPN module coupled to the routing and forwarding module, to one of the VPN data links, and to the management VPN module, the management VPN module to transfer management traffic between the router configuration management module and the one of the VPN data links;

a management port coupled to the router configuration module to receive the non-VPN management commands for the router configuration module.

7. The network device of claim 6 wherein the network device is one of a network switch, a network bridge, a network hub, and a network gateway.

8. The network device of claim 6 wherein the network device can perform one of Internet Protocol (IP) services, Multiprotocol Label Switching (MPLS) services, and Asynchronous Transfer Mode (ATM) services.

9. The network device of claim 6 wherein the source of the management commands is one of a management device and a management function.

10. A network device that provides routing and forwarding services, the network device comprising:

means for transferring data between core data links and customer data links where the customer data links including Virtual Private Network (VPN) data links and non-VPN data links;

means for dedicating one of the VPN data links to the transfer of management traffic;

means for linking the dedicated VPN data link to a source of management commands;

means for using the VPN to transfer management commands from the source of the management commands to the network device; and means for transferring management commands between the dedicated VPN data link and a router configuration management module.

11. The network device of claim 10 wherein the means for transferring management commands between the dedicated VPN data link and a router configuration management module includes means for transferring management commands through a management port of the router configuration management module.

12. The network device of claim 10 wherein the network device is one of a network switch, a network bridge, a network hub, and a network gateway.

13. The network device of claim 10 wherein the network device can perform one of Internet Protocol (IP) services, Multiprotocol Label Switching (MPLS) services, and Asynchronous Transfer Mode (ATM) services.

14. The network device of claim 10 wherein the source of the management commands is one of a management device and a management function.

15. A machine-readable storage medium providing instructions, when executed by a processor, cause the processor to perform an operation comprising:

transferring data between core data links and customer data links where the customer data links including Virtual Private Network (VPN) data links and non-VPN data links;

dedicating one of the VPN data links to the transfer of management commands;

linking the dedicated VPN data link to a source of management commands;

using the VPN to transfer management commands from the source of the management commands to the network device; and transferring management commands between the dedicated VPN data link and a router configuration management module.

16. The machine-readable storage medium of claim 15 wherein transferring management commands between the dedicated VPN data link and a router configuration management module includes transferring management commands through a management port of the router configuration management module.

17. The machine-readable storage medium of claim 15 wherein the network device is one of a network switch, a network bridge, a network hub, and a network gateway.

18. The machine-readable storage medium of claim 15, further providing instructions, which if executed by the processor, further cause the processor to perform an operation comprising one of performing Internet Protocol (IP) services, performing Multiprotocol Label Switching (MPLS) services, and performing Asynchronous Transfer Mode (ATM) services.

19. The machine-readable storage medium of claim 15 wherein the source of the management commands is one of a management device and a management function.

20. A data network comprising:

a plurality of network devices that provide routing and forwarding services for the data network including transferring data between core data links and customer data links, the customer data links including Virtual Private Network (VPN) data links and non-VPN data links, wherein each of the plurality of network devices includes:

a routing and forwarding module to transfer data between core data links and customer data links in accordance with source and destination information contained in the data;

a router configuration management module to perform management operations for the network device according to received management traffic; and a management VPN module coupled to the routing and forwarding module, to one of the VPN data links, and to the management VPN module, the management VPN module to transfer management traffic between the router configuration management module and the one of the VPN data links.

21. The data network of claim 20 wherein each of the plurality of network devices is one of a network switch, a network bridge, a network hub, and a network gateway.

22. The data network of claim 20 wherein the plurality of network devices can perform one of Internet Protocol (IP) services, Multiprotocol Label Switching (MPLS) services, and Asynchronous Transfer Mode (ATM) services.

23. The data network of claim 20 wherein the source of the management commands is one of a management device and a management function.

* * * * *